United States Patent
Balonado et al.

(10) Patent No.: US 7,349,994 B2
(45) Date of Patent: Mar. 25, 2008

(54) METHOD AND APPARATUS FOR COORDINATING ROUTING PARAMETERS VIA A BACK-CHANNEL COMMUNICATION MEDIUM

(75) Inventors: Omar C. Balonado, Palo Alto, CA (US); Sean P. Finn, Belmont, CA (US); Mansour J. Karam, Mountain View, CA (US); Michael A. Lloyd, San Carlos, CA (US); Herbert S. Madan, Tiburon, CA (US); James G. McGuire, San Francisco, CA (US); Jose-Miguel Pulido Villaverde, Palo Alto, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 699 days.

(21) Appl. No.: 09/960,623

(22) Filed: Sep. 20, 2001

(65) Prior Publication Data

US 2002/0075813 A1    Jun. 20, 2002

Related U.S. Application Data

(63) Continuation-in-part of application No. 09/903,441, filed on Jul. 10, 2001, and a continuation-in-part of application No. 09/923,924, filed on Aug. 6, 2001, and a continuation-in-part of application No. 09/903,423, filed on Jul. 10, 2001.

(60) Provisional application No. 60/241,450, filed on Oct. 17, 2000, provisional application No. 60/275,206, filed on Mar. 12, 2001.

(51) Int. Cl.
*G06F 15/16* (2006.01)

(52) U.S. Cl. ...................... 709/250; 709/238

(58) Field of Classification Search ............... 709/200, 709/237, 238, 239, 230, 250, 201–203, 219, 709/231, 223–227, 243–248, 242; 370/238, 370/255, 386, 389, 390, 392, 467, 232, 395, 370/351, 316

See application file for complete search history.

(56) References Cited

U.S. PATENT DOCUMENTS 4,284,852 A    8/1981    Szybicki et al. ......... 179/18 EA (Continued)

FOREIGN PATENT DOCUMENTS

EP    0 504 537    3/1991

(Continued)

OTHER PUBLICATIONS

Practical Network Support for IP Traceback—Savage, Wetherall, Karlin . . . (2000) www.stanford.edu/class/cs244b/pdf/sigcomm2000-8-4.pdf.*

(Continued)

*Primary Examiner*—Thong Vu
(74) *Attorney, Agent, or Firm*—Haverstock & Owens LLP

(57) ABSTRACT

Systems and methods are described for enabling routers to coordinate via a back-channel communication medium. The information exchanged over the back-channel is used to increase the number of paths considered for the routers during route optimization. The Decision Makers may assert routes and prefixes to the routers under their control. This may be done via a Border Gateway Protocol (BGP) feed. The Decision Makers, in turn, communicate separately with one another, in order to coordinate routing policy amongst themselves. This coordination may be performed over a back-channel, which may take the form of physical or logical connections between the Decision Makers.

12 Claims, 7 Drawing Sheets

U.S. PATENT DOCUMENTS

| | | | |
|---|---|---|---|
| 4,345,116 A | 8/1982 | Ash et al. ............... | 179/18 EA |
| 4,495,570 A | 1/1985 | Kitajima et al. ............ | 364/200 |
| 4,594,704 A | 6/1986 | Ollivier ........................ | 370/16 |
| 4,669,113 A | 5/1987 | Ash et al. .................... | 379/221 |
| 4,704,724 A | 11/1987 | Krishnan et al. ........... | 379/221 |
| 4,726,017 A | 2/1988 | Krum et al. .................. | 370/85 |
| 4,748,658 A | 5/1988 | Gopal et al. ................. | 379/221 |
| 4,788,721 A | 11/1988 | Krishnan et al. ........... | 379/221 |
| 4,839,798 A | 6/1989 | Eguchi et al. ............... | 364/200 |
| 4,920,432 A | 4/1990 | Eggers et al. ............. | 360/33.1 |
| 4,931,941 A | 6/1990 | Krishnan ..................... | 364/437 |
| 4,939,726 A | 7/1990 | Flammer et al. ........... | 370/94.1 |
| 4,949,187 A | 8/1990 | Cohen ........................ | 358/335 |
| 4,949,248 A | 8/1990 | Caro ........................... | 364/200 |
| 5,142,570 A | 8/1992 | Chaudhary et al. ......... | 379/221 |
| 5,172,413 A | 12/1992 | Bradley et al. ............... | 380/20 |
| 5,253,341 A | 10/1993 | Rozmanith et al. ......... | 395/200 |
| 5,287,537 A | 2/1994 | Newmark et al. .......... | 395/800 |
| 5,291,554 A | 3/1994 | Morales ........................ | 380/5 |
| 5,341,477 A | 8/1994 | Pitkin et al. ................. | 395/200 |
| 5,343,463 A | 8/1994 | van Tetering et al. ........ | 370/13 |
| 5,361,256 A * | 11/1994 | Doeringer et al. ........... | 370/390 |
| 5,371,532 A | 12/1994 | Gelman et al. ................. | 348/7 |
| 5,375,070 A | 12/1994 | Hershey et al. | |
| 5,406,502 A | 4/1995 | Haramaty et al. ..... | 364/551.01 |
| 5,410,343 A | 4/1995 | Coddington et al. ........... | 348/7 |
| 5,414,455 A | 5/1995 | Hooper et al. ................. | 348/7 |
| 5,442,389 A | 8/1995 | Blahut et al. ................... | 348/7 |
| 5,442,390 A | 8/1995 | Hooper et al. ................. | 348/7 |
| 5,442,749 A | 8/1995 | Northcutt et al. ...... | 395/200.09 |
| 5,452,294 A | 9/1995 | Natarajan ..................... | 370/54 |
| 5,467,345 A | 11/1995 | Cutler, Jr. et al. ............. | 370/60 |
| 5,471,622 A | 11/1995 | Eadline ....................... | 395/650 |
| 5,471,623 A * | 11/1995 | Napolitano, Jr. ............ | 709/243 |
| 5,475,615 A | 12/1995 | Lin ............................. | 364/514 |
| 5,477,536 A | 12/1995 | Picard .......................... | 370/54 |
| 5,508,732 A | 4/1996 | Bottomley et al. ............. | 348/7 |
| 5,515,511 A | 5/1996 | Nguyen et al. .......... | 395/200.2 |
| 5,519,435 A | 5/1996 | Anderson ....................... | 348/8 |
| 5,521,591 A | 5/1996 | Arora et al. ................. | 340/826 |
| 5,528,281 A | 6/1996 | Grady et al. .................... | 348/7 |
| 5,535,195 A | 7/1996 | Lee ............................. | 370/54 |
| 5,537,394 A | 7/1996 | Abe et al. ..................... | 370/17 |
| 5,563,875 A | 10/1996 | Hefel et al. .................... | 370/15 |
| 5,574,938 A * | 11/1996 | Bartow et al. ............... | 709/235 |
| 5,590,126 A | 12/1996 | Mishra et al. ............... | 370/329 |
| 5,629,930 A | 5/1997 | Beshai et al. ................ | 370/376 |
| 5,631,897 A | 5/1997 | Pacheco et al. ............. | 370/237 |
| 5,636,216 A | 6/1997 | Fox et al. ..................... | 370/402 |
| 5,654,958 A | 8/1997 | Natarajan ................... | 370/410 |
| 5,659,796 A * | 8/1997 | Thorson et al. ............. | 709/241 |
| 5,668,800 A | 9/1997 | Stevenson ................... | 370/248 |
| 5,675,741 A | 10/1997 | Aggarwal et al. ...... | 395/200.12 |
| 5,729,528 A | 3/1998 | Salingre et al. ............. | 370/230 |
| 5,754,547 A | 5/1998 | Nakazawa .................. | 370/401 |
| 5,754,639 A | 5/1998 | Flockhart et al. ........... | 379/221 |
| 5,787,253 A | 7/1998 | McCreery et al. ..... | 395/200.61 |
| 5,793,976 A | 8/1998 | Chen et al. ............ | 395/200.54 |
| 5,802,106 A | 9/1998 | Packer | |
| 5,805,594 A | 9/1998 | Kotchey et al. ............. | 370/401 |
| 5,812,528 A | 9/1998 | VanDervort .................. | 370/235 |
| 5,835,710 A | 11/1998 | Nagami et al. ........... | 395/200.8 |
| 5,841,775 A | 11/1998 | Huang ......................... | 370/422 |
| 5,845,091 A | 12/1998 | Dunne et al. ............ | 395/200.7 |
| 5,884,047 A | 3/1999 | Aikawa et al. ........ | 395/200.68 |
| 5,935,216 A * | 8/1999 | Benner et al. ............... | 709/248 |
| 5,940,478 A | 8/1999 | Vaudreuil et al. ........ | 379/88.18 |
| 5,944,779 A * | 8/1999 | Blum .......................... | 709/201 |
| 5,974,457 A | 10/1999 | Waclawsky et al. | |
| 6,006,264 A | 12/1999 | Colby et al. ................. | 709/226 |
| 6,009,081 A * | 12/1999 | Wheeler et al. ............. | 370/255 |
| 6,012,088 A | 1/2000 | Li et al. ...................... | 709/219 |
| 6,026,411 A | 2/2000 | Ronen | |
| 6,034,946 A | 3/2000 | Roginsky et al. | |
| 6,052,718 A * | 4/2000 | Gifford ........................ | 709/219 |
| 6,069,889 A | 5/2000 | Feldman et al. ............. | 370/351 |
| 6,078,963 A * | 6/2000 | Civanlar et al. ............. | 709/238 |
| 6,108,703 A | 8/2000 | Leighton et al. ............. | 709/226 |
| 6,111,881 A | 8/2000 | Soncodi ....................... | 370/395 |
| 6,119,235 A | 9/2000 | Vaid et al. | |
| 6,130,890 A | 10/2000 | Leinwand et al. .......... | 370/400 |
| 6,167,052 A | 12/2000 | McNeil et al. ............... | 370/399 |
| 6,173,324 B1 | 1/2001 | D'Souza ...................... | 709/224 |
| 6,178,448 B1 | 1/2001 | Gray et al. ................... | 709/224 |
| 6,185,598 B1 * | 2/2001 | Farber et al. ................ | 709/200 |
| 6,185,601 B1 | 2/2001 | Wolff .......................... | 709/203 |
| 6,189,044 B1 * | 2/2001 | Thomson et al. ............ | 709/242 |
| 6,226,266 B1 | 5/2001 | Galand et al. | |
| 6,275,470 B1 | 8/2001 | Ricciulli | |
| 6,282,562 B1 | 8/2001 | Sidi et al. | |
| 6,286,045 B1 | 9/2001 | Griffiths et al. | |
| 6,292,832 B1 | 9/2001 | Shah et al. .................. | 709/226 |
| 6,317,778 B1 * | 11/2001 | Dias et al. ................... | 709/214 |
| 6,339,595 B1 * | 1/2002 | Rekhter et al. .............. | 370/392 |
| 6,341,309 B1 | 1/2002 | Vaid et al. | |
| 6,385,643 B1 * | 5/2002 | Jacobs et al. ................ | 709/203 |
| 6,393,486 B1 * | 5/2002 | Pelavin et al. .............. | 709/238 |
| 6,415,323 B1 | 7/2002 | McCanne et al. | |
| 6,426,955 B1 | 7/2002 | Gossett Dalton, Jr. et al. ........................... | 370/401 |
| 6,434,606 B1 | 8/2002 | Borella et al. | |
| 6,438,592 B1 | 8/2002 | Killian | |
| 6,446,028 B1 | 9/2002 | Wang ........................... | 702/186 |
| 6,452,950 B1 | 9/2002 | Ohlsson et al. | |
| 6,453,356 B1 * | 9/2002 | Sheard et al. ................ | 709/231 |
| 6,463,454 B1 | 10/2002 | Lumelsky et al. | |
| 6,493,353 B2 * | 12/2002 | Kelly et al. .................. | 370/467 |
| 6,522,627 B1 | 2/2003 | Mauger ....................... | 370/230 |
| 6,526,056 B1 | 2/2003 | Rekhter et al. | |
| 6,538,416 B1 | 3/2003 | Hahne et al. ................ | 320/431 |
| 6,553,423 B1 * | 4/2003 | Chen .......................... | 709/230 |
| 6,556,582 B1 | 4/2003 | Redi ........................... | 370/443 |
| 6,601,098 B1 | 7/2003 | Case et al. | |
| 6,601,101 B1 * | 7/2003 | Lee et al. ................... | 709/227 |
| 6,608,841 B1 | 8/2003 | Koodli | |
| 6,611,872 B1 * | 8/2003 | McCanne .................... | 709/238 |
| 6,614,789 B1 | 9/2003 | Yazdani et al. .............. | 370/392 |
| 6,625,648 B1 | 9/2003 | Schwaller et al. | |
| 6,631,419 B1 | 10/2003 | Greene | |
| 6,633,640 B1 | 10/2003 | Cohen et al. | |
| 6,658,000 B1 * | 12/2003 | Raciborski et al. ......... | 370/386 |
| 6,661,797 B1 | 12/2003 | Goel et al. | |
| 6,687,229 B1 | 2/2004 | Kataria et al. ............... | 370/238 |
| 6,704,768 B1 * | 3/2004 | Zombek et al. ............. | 709/201 |
| 6,704,795 B1 * | 3/2004 | Fernando et al. ............ | 709/237 |
| 6,707,824 B1 | 3/2004 | Achilles et al. ............. | 370/412 |
| 6,711,137 B1 | 3/2004 | Klassen et al. | |
| 6,711,152 B1 * | 3/2004 | Kalmanek et al. .......... | 370/351 |
| 6,714,549 B1 | 3/2004 | Phaltankar | |
| 6,728,484 B1 | 4/2004 | Ghani ........................... | 398/42 |
| 6,728,777 B1 * | 4/2004 | Lee et al. ................... | 709/238 |
| 6,728,779 B1 * | 4/2004 | Griffin et al. ............... | 709/239 |
| 6,748,426 B1 | 6/2004 | Shaffer et al. | |
| 6,751,562 B1 * | 6/2004 | Blackett et al. ............. | 702/61 |
| 6,757,255 B1 | 6/2004 | Aoki et al. ................... | 370/252 |
| 6,760,775 B1 | 7/2004 | Anerousis et al. ........... | 709/238 |
| 6,760,777 B1 * | 7/2004 | Agarwal et al. ............. | 709/238 |
| 6,766,381 B1 | 7/2004 | Barker et al. | |
| 6,795,399 B1 | 9/2004 | Benmohamed et al. | |
| 6,795,860 B1 | 9/2004 | Shah ........................... | 709/229 |
| 6,801,502 B1 | 10/2004 | Rexford et al. ............. | 370/235 |
| 6,810,417 B2 | 10/2004 | Lee ............................ | 709/220 |
| 6,819,662 B1 * | 11/2004 | Grover et al. ............... | 370/351 |
| 6,820,133 B1 | 11/2004 | Grove et al. ................. | 709/238 |

| | | | |
|---|---|---|---|
| 6,826,613 B1* | 11/2004 | Wang et al. ................. | 709/227 |
| 6,829,221 B1* | 12/2004 | Winckles et al. ........... | 370/238 |
| 6,829,654 B1* | 12/2004 | Jungck ....................... | 709/246 |
| 6,836,463 B2 | 12/2004 | Garcia-Luna-Aceves et al. .......................... | 370/238 |
| 6,839,745 B1* | 1/2005 | Dingari et al. .............. | 709/219 |
| 6,839,751 B1 | 1/2005 | Dietz et al. ................. | 709/224 |
| 6,885,641 B1 | 4/2005 | Chan et al. | |
| 6,909,700 B1 | 6/2005 | Benmohamed et al. | |
| 6,912,222 B1 | 6/2005 | Wheeler et al. ........ | 370/395.31 |
| 6,956,858 B2 | 10/2005 | Hariguchi et al. ..... | 370/395.31 |
| 6,963,575 B1 | 11/2005 | Sisanizadeh et al. ........ | 370/404 |
| 6,973,490 B1 | 12/2005 | Robertson et al. .......... | 709/224 |
| 6,981,055 B1* | 12/2005 | Ahuja et al. ................ | 709/238 |
| 6,993,584 B2* | 1/2006 | Border et al. ............... | 709/227 |
| 7,002,917 B1 | 2/2006 | Saleh | |
| 7,020,086 B2 | 3/2006 | Juttner et al. ............... | 370/238 |
| 7,043,541 B1* | 5/2006 | Bechtolsheim et al. ..... | 709/223 |
| 7,043,562 B2* | 5/2006 | Dally et al. ................. | 709/238 |
| 7,065,584 B1 | 6/2006 | Shavitt et al. | |
| 7,085,230 B2 | 8/2006 | Hardy ........................ | 370/232 |
| 7,111,073 B1 | 9/2006 | Jain et al. ................... | 709/241 |
| 7,123,620 B1 | 10/2006 | Ma ............................ | 370/395.32 |
| 7,155,436 B2* | 12/2006 | Hegde et al. ............... | 707/10 |
| 7,269,157 B2* | 9/2007 | Klinker et al. .............. | 370/351 |
| 2001/0010059 A1 | 7/2001 | Burman et al. ............. | 709/224 |
| 2001/0026537 A1* | 10/2001 | Massey ...................... | 370/316 |
| 2001/0026549 A1* | 10/2001 | Hameleers et al. ......... | 370/389 |
| 2001/0037311 A1 | 11/2001 | McCoy et al. | |
| 2002/0038331 A1 | 3/2002 | Flavin | |
| 2002/0087687 A1* | 7/2002 | Zaifman et al. ............ | 709/225 |
| 2002/0101821 A1* | 8/2002 | Feldmann et al. .......... | 370/232 |
| 2002/0124100 A1 | 9/2002 | Adams | |
| 2002/0152318 A1* | 10/2002 | Menon et al. ............... | 709/231 |
| 2002/0184527 A1* | 12/2002 | Chun et al. ................. | 713/201 |
| 2003/0016770 A1 | 1/2003 | Trans et al. | |
| 2003/0191841 A1* | 10/2003 | DeFerranti et al. ......... | 709/226 |
| 2004/0030776 A1 | 2/2004 | Cantrell et al. ............. | 709/224 |
| 2005/0044270 A1 | 2/2005 | Grove et al. ................ | 709/238 |
| 2005/0083912 A1 | 4/2005 | Afshar et al. ............... | 370/352 |
| 2005/0132060 A1 | 6/2005 | Mo et al. .................... | 709/227 |
| 2005/0185654 A1* | 8/2005 | Zadikian et al. ........ | 370/395.21 |
| 2005/0201302 A1 | 9/2005 | Gaddis et al. .............. | 370/254 |
| 2005/0243726 A1 | 11/2005 | Narendran .................. | 370/238 |
| 2006/0026682 A1 | 2/2006 | Zakas ........................ | 726/22 |

FOREIGN PATENT DOCUMENTS

| | | |
|---|---|---|
| EP | 0 528 075 | 2/1993 |
| EP | 0 788 267 | 8/1997 |
| EP | 0 598 969 B1 | 2/1999 |
| EP | 0 942 560 | 9/1999 |
| EP | 0 977 456 A2 | 2/2000 |
| EP | 0 982 901 A1 | 3/2000 |
| EP | 0 999 674 A1 | 5/2000 |
| WO | 94/08415 | 4/1994 |
| WO | 99/14907 | 3/1999 |
| WO | 99/14931 | 3/1999 |
| WO | 99/14932 | 3/1999 |
| WO | 99/18751 | 4/1999 |
| WO | 99/30460 | 6/1999 |
| WO | 99/39481 | 8/1999 |
| WO | 00/04458 | 1/2000 |
| WO | WO 00/25224 | 5/2000 |
| WO | WO 00/38381 | 6/2000 |
| WO | 00/45560 | 8/2000 |
| WO | 00/52906 | 9/2000 |
| WO | 00/62489 | 10/2000 |
| WO | 00/72528 | 11/2000 |
| WO | 00/79362 | 12/2000 |
| WO | 00/79730 | 12/2000 |
| WO | 01/06717 | 1/2001 |
| WO | 01/13585 | 2/2001 |
| WO | WO 02/33896 A3 | 4/2002 |

OTHER PUBLICATIONS

Heuristics for Internet Map Discovery—Govindan, Tangmunarunkit (2000) ftp.usc.edu/pub/csinfo/tech-reports/papers/99-717.ps.Z.*

Deriving Traffic Demands for Operational IP . . . —Feldmann . . . (2000) www.research.att.com/~jrex/papers/sigcomm00.ps.*

Manageability, Availability and Performance in Porcupine . . . —Saito, Bershad, Levy (1999) www.cs.cmu.edu/People/bumba/filing_cabinet/./papers/sosp99/saito.ps.gz.*

Content Based Routing as the Basis for Intra-Agent Communication—Skarmeas, Clark (1999) laotzu.doc.ic.ac.uk/UserPages/staff/ns4/papers/atal98.ps.gz.*

Intelligent Routing based on Active Patterns as the basis for . . . —Skarmeas, Clark (1997) laotzu.doc.ic.ac.uk/UserPages/staff/ns4/papers/message_board.ps.gz.*

Arguments in favour of admission control for TCP flows—Massoulié, Roberts (1999) www.res.enst.fr/~oueslati/Pub/itc16.ps.*

Developing Shared Ontologies in Multi-agent Systems—Jones (1998) www.csc.liv.ac.uk/~dean/papers/ECAI98.ps.gz.*

Controlling the Impact of BGP Policy Changes on IP Traffic—Feamster, Borkenhagen (2001) nms.lcs.mit.edu/~feamster/papers/att-tm01.ps.*

An Intelligent-agent framework for concurrent product design and planning. Gek Woo Tan et al, 1996.*

Z. Wang et al., "Resource Allocation for Elastic Traffic: Architecture and Mechanisms," Conference Proceedings Article, 2000, XP010376681, pp. 159-169.

Paul Francis et al., "An Architecture for a Global Internet Host Distance Estimation Service," pp. 1-17.

T. Bates et al., "Multiprotocol Extensions for BGP-4", XP-00219077, Jun. 2000, pp. 1-10.

S. Kumar et al., "The MASC/BGMP Architecture for Inter-domain Multicast Routing," 12 pages.

S. Berson et al., "An Architecture for Advance Reservations in the Internet," USC Information Sciences Institute, Jul. 16, 1998, pp. 1-21.

R. P. Draves et al., "Constructing Optimal IP Routing Tables," 1999 IEEE, 1-10.

R. Govindan et al., "An Analysis of Internet Inter-Domain Topology and Route Stability," USC Information Sciences Institute, 1997 IEEE, 8 pages.

V. Paxson, "Toward a Framework for Defining Internet Performance Metrics," http://www.isoc.org/inet96/proceedings/d3/d3_3.htm, pp. 1-20.

C. Alaettinoglu et al. "Routing Policy Specification Language (RPSL)," http://quimby.gnus.org/internet-drafts/draft-ietf-rps-rpsl-v2-00.txt, pp. 1-56.

P. Traina, "BGP-4 Protocol Analysis," Mar. 1995, pp. 1-10.

B. Krishnamurthy et al., "On Network-Aware Clustering of Web Clients," 14 pages.

Sami Iren et al., "The Transport Layer: Tutorial and Survey", XP-002210446, ACM Computing Surveys, vol. 31, No. 4, Dec. 1999, pp. 360-405.

D. B. Ingham et al., "Supporting Highly Manageable Web Services", Computer Networks and ISDN Systems 29 (1997), pp. 1405-1416.

J. Yu; "Scalale Routing Design Principles"; Ref. No. XP002191098, RFC 2791 Network Working Group; Jul. 31, 2000; pp. 1-24.

"A Longest Prefix Match Search Engine for Multi-Gigabit IP Processing", Masayoshi Kobayashi et al., C&C Media Research Laboratories, NEC Corporation, pp. 1360-1364, 2000 IEEE.

"Internet Protocol" from Nortel Networks, www.arvelo.net/net-bay-ip.html. Apr. 6, 2005, 26 pages.

* cited by examiner

METHOD AND APPARATUS FOR COORDINATING ROUTING PARAMETERS VIA A BACK-CHANNEL COMMUNICATION MEDIUM

CROSS REFERENCE TO RELATED APPLICATIONS

This application claims the benefit of U.S. Provisional Applications No. 60/241,450, filed Oct. 17, 2000 and U.S. Provisional Application No. 60/275,206, filed Mar. 12, 2001, and is a continuation-in part of U.S. applications Ser. No. 09/903,441, filed Jul. 10, 2001, U.S. application Ser. No. 09/923,924, filed Aug. 6, 2001, and U.S. application Ser. No. 09/903,423, filed Jul. 10, 2001. These applications are herein incorporated by reference.

BACKGROUND OF THE INVENTION

1. Field of the Invention

This invention relates to the field of networking. In particular, the invention relates to systems and methods for coordinating routing information amongst routers.

2. Description of the Related Art

Internetworks such as the Internet are currently comprised of Autonomous Systems, which exchange routing information via exterior gateway protocols. Amongst the most important of these protocols is the Border Gateway Protocol, or BGP. BGPv4 constructs a directed graph of the Autonomous Systems, based on the information exchanged between BGP routers. Each Autonomous System is identified by a unique 16 bit AS number, and BGP ensures loop-free routing amongst the Autonomous Systems; BGP also enables the exchange of additional routing information between Autonomous Systems. BGP is further described in several RFCs, which are compiled in *The Big Book of Border Gateway Protocol RFCs*, by Pete Loshin, which is hereby incorporated by reference.

The Border Gateway Protocol provides network administrators some measure of control over outbound traffic control from their respective organizations. For instance, the protocol includes a LOCAL_PREF attribute, which allows BGP speakers to inform other BGP speakers within the Autonomous System of the speaker's preference for an advertised route. The local preference attribute includes a degree of preference for the advertised route, which enables comparison against other routes for the same destination. As the LOCAL_PREF attribute is shared with other routers within an Autonomous System via IBGP, it determines outbound routes used by routers within the Autonomous System.

A WEIGHT parameter may also be used to indicate route preferences; higher preferences are assigned to routes with higher values of WEIGHT. The WEIGHT parameter is a proprietary addition to the BGPv4 supported by Cisco Systems, Inc. of San Jose, Calif. In typical implementations, the WEIGHT parameter is given higher precedence than other BGP attributes.

The performance knobs described above are, however, rather simple, as they do not offer system administrators with sufficiently sophisticated means for enabling routers to discriminate amongst routes. There is a need for technology that enables greater control over outbound routing policy. In particular, there is a need to allow performance data about routes to be exchanged between routers. Additionally, system administrators should be able to fine tune routing policy based upon sophisticated, up-to-date measurements of route performance and pricing analysis of various routes.

SUMMARY OF THE INVENTION

The invention includes systems and methods for enabling networking devices to coordinate via a back-channel communication medium. The information exchanged over the back-channel is used to increase the number of paths considered for the routers during route optimization.

In embodiments of the invention, a set of Routing Intelligence Units may be used to control a set of routers, such that each Routing Intelligence Unit controls a distinct subset of the routers. The Routing Intelligence Units may assert routes to the routers under their control. In some embodiments, this is done via a Border Gateway Protocol (BGP) feed. The Decision Makers, in turn, communicate separately with one another, in order to coordinate routing policy amongst themselves. This coordination may be performed over a back-channel, which may take the form of physical or logical connections between the Routing Intelligence Units. In some embodiments, communications over the back-channel are conducted via separate BGP sessions. In embodiments utilizing BGP for communication to the routers and the back-channel, the Routing Intelligence Unit may be configured as a route-reflector client to both other decision makers and the routers it controls. This ensures that the Routing Intelligence Unit does not simply transmit information in either direction without consideration.

In some embodiments of the invention, a Routing Intelligence Unit sends updates to other Routing Intelligence Units whenever the Routing Intelligence Unit is also asserting to the routers under its control. In alternative embodiments, the Routing Intelligence Unit may send updates when it decides that the current routes are correct.

In some embodiments of the invention, performance scores for prefixes are communicated between Routing Intelligence Units. In some of the embodiments utilizing BGP for such coordination, these performance scores are translated to units of Local Preference. This ensures that the Routing Intelligence Units will automatically select and propagate the best score.

Some embodiments of the invention include techniques enabling Routing Intelligence Units to evaluate prefixes that arrive via coordination. In some embodiments, when local and remote routes have comparable scores, the local route is chosen by default. In other embodiments, a static penalty is applied to all remote announcements. In some embodiments, dynamic penalties are applied. These and other embodiments are described in greater detail infra.

DETAILED DESCRIPTION

A. System Overview

Figure 1:
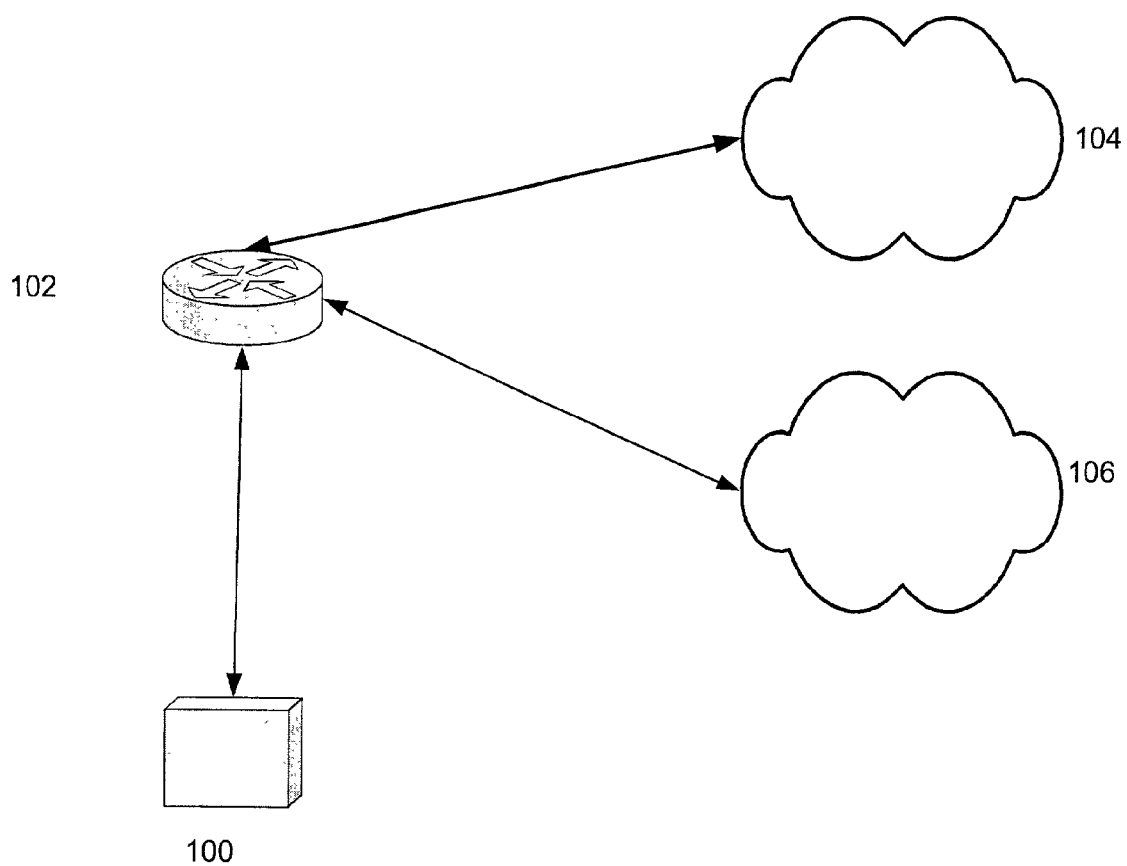
FIG. 1-FIG. 4 illustrate different configurations of routing intelligence units and edge routers, according to some embodiments of the invention.
Figure 2:
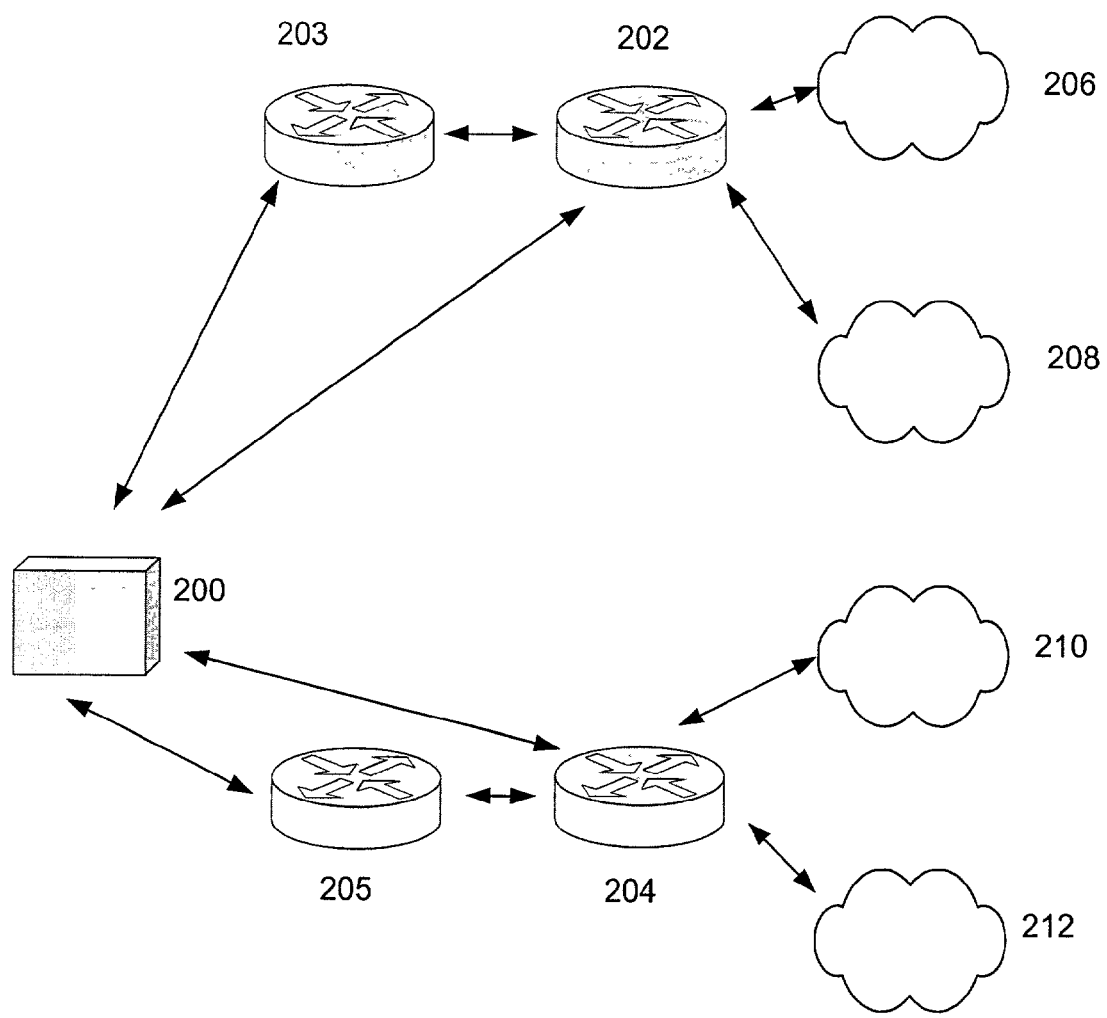
Figure 3:
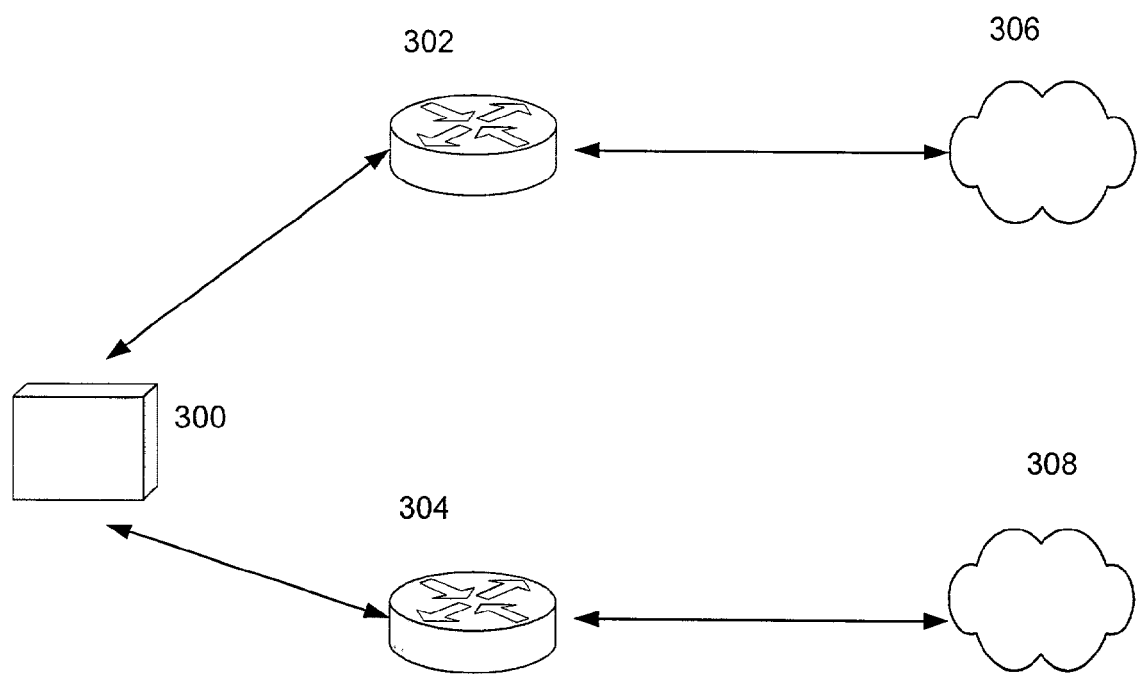
Figure 4:
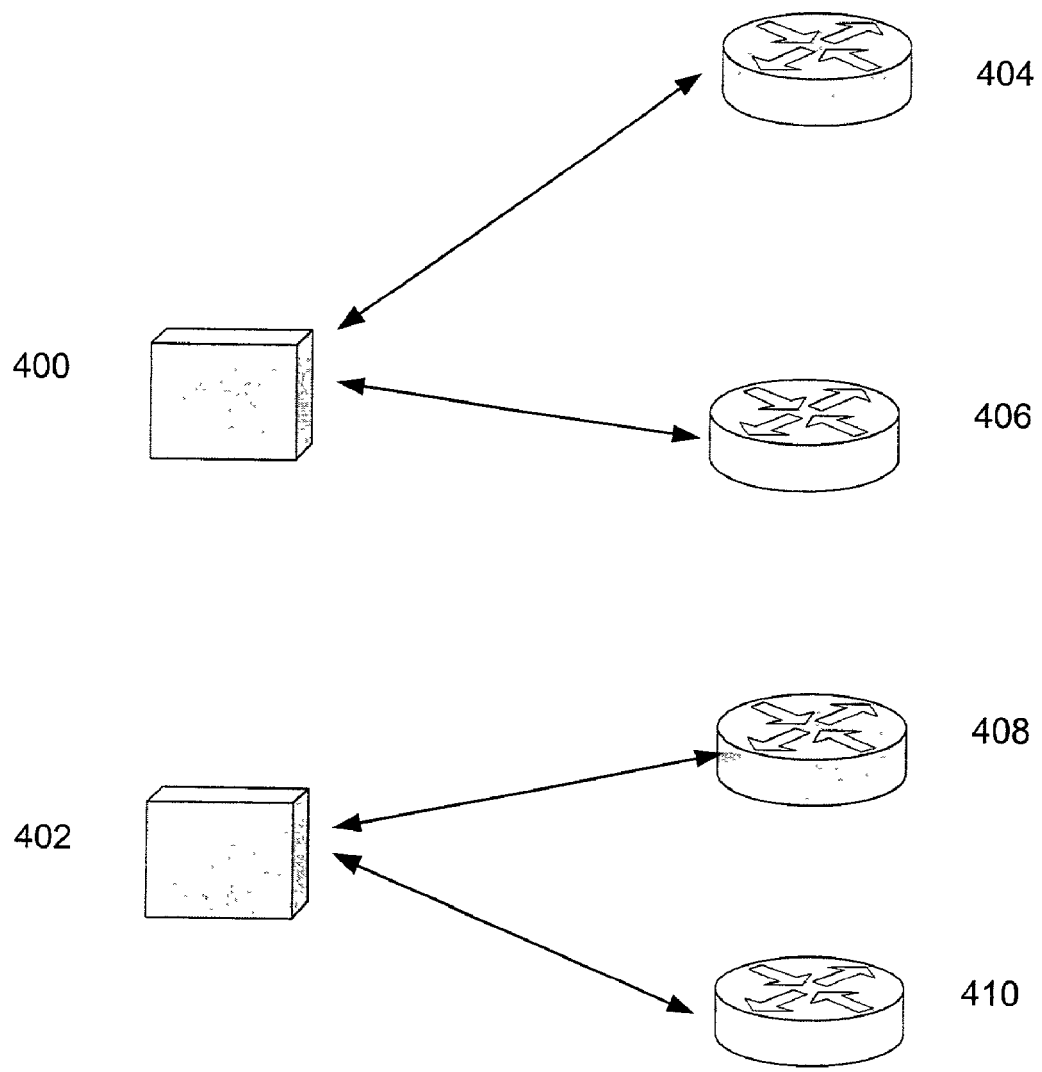

In some embodiments of the invention, one or more routing intelligence units are stationed at the premises of a multi-homed organization, each of which controls one or more edge routers. These devices inject BGP updates to the Edge Routers they control, based on performance data from measurements obtained locally, or from a Routing Intelligence Exchange—Routing Intelligence Exchanges are further described in U.S. Provisional Applications No. 60/241,450, filed Oct. 17, 2000 and U.S. Provisional Application No. 60/275,206, filed Mar. 12, 2001, and U.S. application Ser. No. 09/903,441, filed Jul. 10, 2001, U.S. application Ser. No. 09/923,924, filed Aug. 6, 2001, and U.S. application Ser. No. 09/903,423, filed Jul. 10, 2001, which are hereby incorporated by reference in their entirety. Different configurations of these routing intelligence units and edge routers are illustrated in FIGS. 1 through 4. In some embodiments illustrated in FIG. 1, one edge router 102 with multiple ISPs 104 and 106 is controlled by a single device 100. FIG. 2 illustrates embodiments in which the routing intelligence unit 200 controls multiple edge routers 202 and 204, each of which in turn links to multiple ISPs 206, 208, 210, and 212; FIG. 2 also illustrates embodiments in which routers 203 205 controlled by the routing intelligence unit 200 are not coupled to SPALs. In FIG. 3, a single routing intelligence unit 300 controls multiple edge routers 302 and 304, each of which is linked to exactly one ISP 306 and 308. In additional embodiments illustrated in FIG. 4, different routing intelligence units 400 and 402, each connected to a set of local edge routers 404, 406, 408, and 410, may coordinate their decisions. In some embodiments of the invention, the routing intelligence units comprise processes running within one or more processors housed in the edge routers. Other configurations of routing intelligence units and edge routers will be apparent to those skilled in the art.

B. Architecture of Routing Intelligence Units

The routing intelligence units include a Decision Maker resource. At a high level, the objective of the Decision Maker is to improve the end-user, application level performance of prefixes whenever the differential in performance between the best route and the default BGP route is significant. This general objective has two aspects:

One goal is to reach a steady state whereby prefixes are, most of the time, routed through the best available Service Provider Access Link (i.e., SPAL), that is, through the SPAL that is the best in terms of end-to-end user performance for users belonging to the address space corresponding to that prefix. To achieve this goal, the Decision Maker will send a significant amount of updates to the router (over a tunable period of time) until steady state is reached. This desirable steady state results from a mix of customer-tunable criteria, which may include but are not limited to end-to-end user measurements, load on the links, and/or cost of the links.

Current measurements of end-to-end user performance on the Internet show that fluctuations in performance are frequent. Indeed, the reasons for deterioration of performance of a prefix may include, but are not limited to the following:

The network conditions can vary along the path used by the packets that correspond to that prefix on their way to their destination.

Alternatively, the access link through which the prefix is routed can go down.

The Service Provider to which the prefix is routed can lose coverage for that prefix.

In such occurrences, the routing intelligence unit should detect the deterioration/failure, and quickly take action to alleviate its effect on the end-user.

In order to optimize application performance, the routing intelligence unit converts measurements on the performance of routes traversing the edge-routers into scores that rate the quality of the end-to-end user experience. This score depends on the application of interest, namely voice, video and HTTP web traffic. In some embodiments of the invention, by default, the routing intelligence unit attempts to optimize the performance of web applications, so its decisions are based on a score model for HTTP. However, in such embodiments, the customer has the choice between all of voice, video, and HTTP.

In order to avoid swamping routers with BGP updates, in some embodiments of the invention, the maximum rate of update permitted by the routing intelligence unit is offered as, for example, a control, such as a knob that is set by the customer. The faster the rate of updates, the faster the system can react in the event of specific performance deteriorations or link failures.

However, the rate of updates should be low enough not to overwhelm the router. In some embodiments, the selected rate will depend on the customer's setting (e.g., the traffic pattern, link bandwidth, etc.); for example, faster rates are reserved to large enterprises where the number of covered prefixes is large. Even when the rate of updates is slow, in some embodiments of the invention, the most urgent updates are still scheduled first: this is performed by sorting the prefix update requests in a priority queue as a function of their urgency. The priority queue is then maintained in priority order. In some embodiments of the invention, the most urgent events (such as loss of coverage, or link failure) bypass this queue and are dealt with immediately.

In case interface statistics are available, the Decision Maker may directly use the corresponding information to function in an optimized way. For example, in some embodiments of the invention, the Decision Maker can use bandwidth information to make sure that a link of lower bandwidth is not swamped by too much traffic; in a similar manner, link utilization can be used to affect the rate of BGP updates sent to the router. Finally, the decision maker may use per-link cost information, as provided by the user to tailor its operation. For example, assume that the router is connected to the Internet through two links: Link 1 is a full T3, while Link 2 is a burstable T3, limited to 3 Mbit/sec. That is, whenever load exceeds the 3 Mbit/sec mark on Link 2, the user incurs a penalty cost. Combining information pertaining to per-link cost and utilization, the Decision Maker can attempt to minimize the instances in which load exceeds 3 Mbit/sec on Link 2, thus resulting in reduced costs to the user.

In some implementations, the Decision Maker may also use configurable preference weights to adjust link selection. The cost of carrying traffic may vary between links, or a user may for other reasons prefer the use of certain links. The Decision Maker can attempt to direct traffic away from some links and towards others by penalizing the measurements obtained on the less preferred links; conversely, if different links have comparable measured performance, traffic is directed away from the less preferred links.

Some embodiments of this invention can take into account more parameters, such as more information about SPALs and prefixes. However, despite the utility of such enhancements, the Decision Maker is designed to work well even when it relies on information provided solely by the edge stats measurements.

In case the Routing Intelligence Unit fails, the design is such that the edge router falls back to the routing that is specified in the BGP feed. The same behavior takes place in case performance routes sent by the prefix scheduler are filtered by the edge routers it controls. Finally, in some embodiments of the invention, a flapping control algorithm is included in the design, avoiding the occurrence of undesirable excessive flapping of a prefix among the different access links.

Figure 5A:
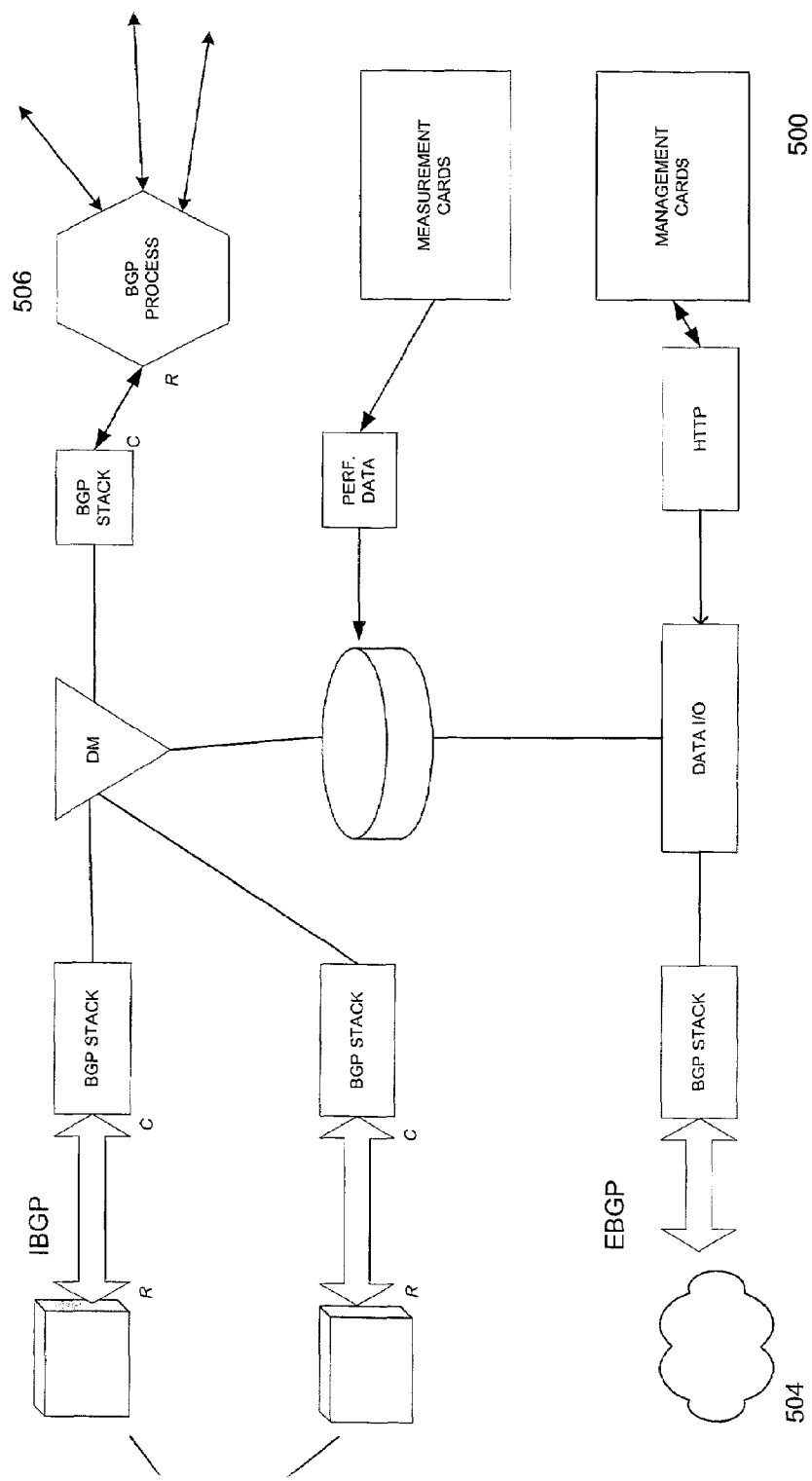
FIG. 5a schematically illustrates an internal architecture of a routing intelligence unit according to some embodiments of the invention.

A diagram showing the high-level architecture of Routing Intelligence Unit, and focused on its BGP settings is shown in FIG. 5a. In the embodiments illustrated in FIG. 5a, three BGP peering types may exist between a given Routing Intelligence Unit 500 and the external world: one to control the local edge router or routers 502 that this particular Routing Intelligence Unit 500 is optimizing, one to a Routing Infrastructure Exchange (RIX) 504, and one to every other Routing Intelligence Unit device with which it coordinates 506, as further described in U.S. Provisional Applications No. 60/241,450, filed Oct. 17, 2000 and U.S. Provisional Application No. 60/275,206, filed Mar. 12, 2001, U.S. application Ser. No. 09/903,441, filed Jul. 10, 2001, U.S. application Ser. No. 09/923,924, filed Aug. 6, 2001, and U.S. application Ser. No. 09/903,423, filed Jul. 10, 2001, which are hereby incorporated by reference in their entirety. In the diagram shown in FIG. 5a, the three external peering types are shown as the arrows at far left (to the Edge Routers 502 and to RIX 504) and far right 506. In order for BGP updates to be propagated to the appropriate devices, some devices are configured to be route reflectors, and others as route reflector clients. In embodiments illustrated in FIG. 5a, the Edge Routers 502 are both route reflectors, and the peer BGP stacks are clients, as indicated by the labels "r" and "c". Similarly, in the peering between the BGP Process 506 and the BGP Stack, the BGP Process 506 is a route reflector, and the BGP Stack is a client. Note that the separation between the BGP Process 506 and BGP Stack is not required in all embodiments. However, when they are separate, the use of route reflection allows the BGP Process 506 to behave as a normal BGP implementation (as described in The Big Book of Border Gateway Protocol RFCs referenced in the Background Of The Invention). Other configurations of the devices that may be used for propagation of BGP updates will be apparent to those skilled in the art.

C. Coordination Between Routing Intelligence Units

Figure 5B:
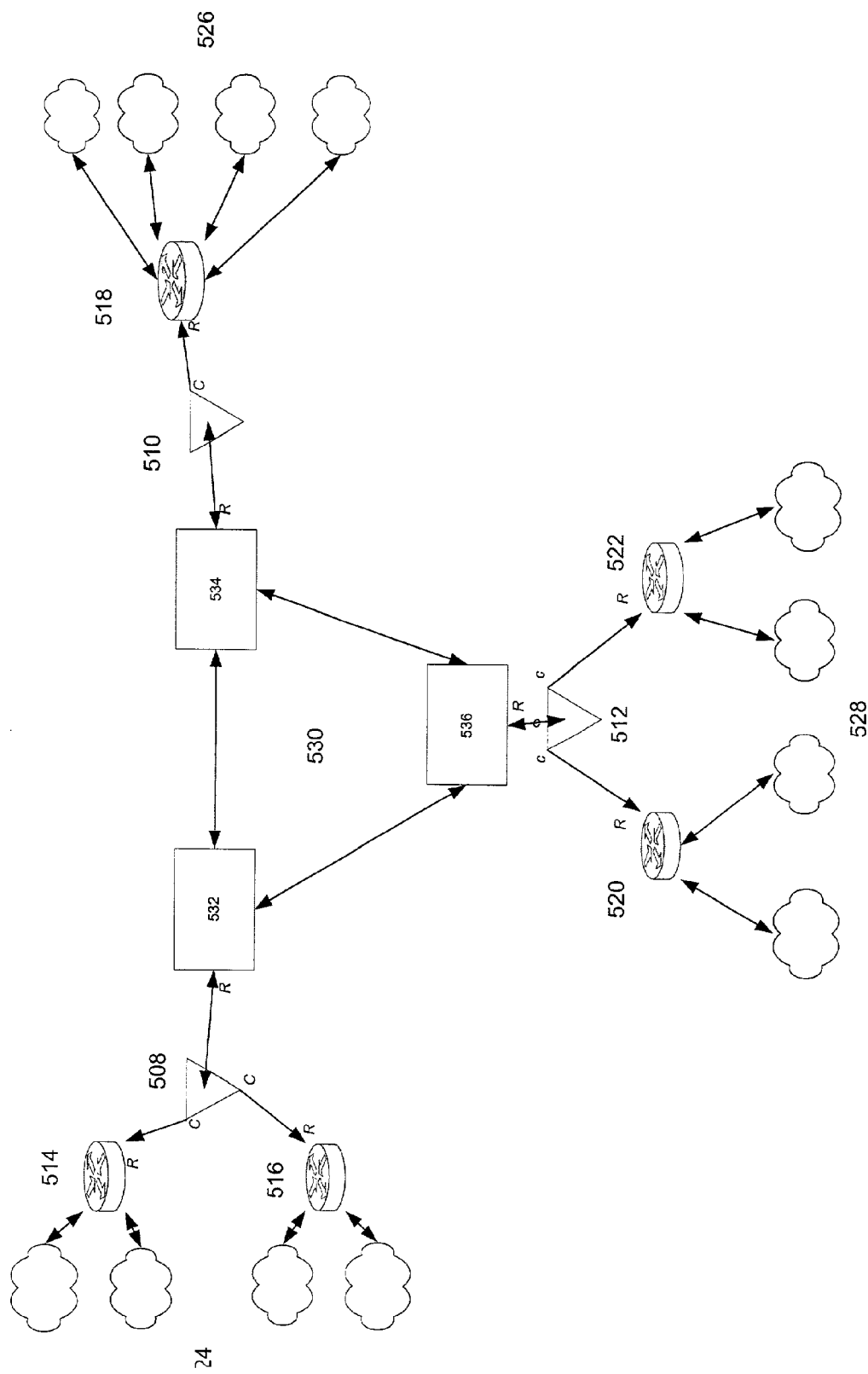
FIG. 5b illustrates coordination between routing intelligence units via a back-channel according to embodiments of the invention.

FIG. 5B schematically illustrates a configuration in which multiple routing intelligence units may coordinate via a back-channel to exchange routing information and set routing policy. Each Routing Intelligence Unit includes a Decision Maker 508 510 512, which in turn controls one or more routers 514 516 518 520 522. The routers 514 516 518 520 522 may in turn be coupled to one or more ISPs 524 526 528. FIG. 5B also illustrates the back-channel 530, comprised of peerings between processes on Remote Coordination Processors (RCPs) 532 534 536; in some embodiments, these may be iBGP or eBGP peerings. Other implementations will be apparent to those skilled in the art. The back-channel 530, or mesh, may be used to communicate information on local path performance characteristics between Routing Intelligence Units, to increase the number of paths considered during optimization.

Such embodiments of the invention may employ BGP environments to support coordination between routers 514 516 518 520 522; alternatively, in some embodiments, this may be accomplished without BGP, by coupling the routers together, either physically or virtually. In embodiments of the invention utilizing BGP environments for coordination, the peerings on the back-channel 530 may be iBGP peerings.

In some embodiments of the invention, each of the Routing Intelligence Units sends its best local score to the others via the back-channel 530. In some such embodiments, local links are preferred over equivalent remote links. Additionally, in some such embodiments, a Routing Intelligence Unit does not send updates directly to remote routers. Rather, remote information is assessed by the local Routing Intelligence Unit prior to being forwarded to the associated router. In embodiments of the back-channel 530 utilizing BGP, techniques such as route reflection and confederation may be used to scale the mesh. In one such embodiment, the coordination of BGP processes may be arranged to match the original router BGP mesh as closely as possible, controlling each BGP router with a separate Routing Intelligence Unit. Other arrangements for the back-channel will be apparent to those skilled in the art.

In some embodiments of the invention, the routers under the control of the Decision Makers 508 510 512 are able to route between themselves by use of a single IP next-hop. For instance, in the example illustrated in FIG. 5B, if a first router 514 forwards packets towards an established next-hop associated with a second router 518, then the packets will arrive at the second router 518.

In some embodiments, the Routing Intelligence Units coordinate by exchanging their best scores with one another. In some implementations, a Decision Maker 508 inside a Routing Intelligence Unit can elect to send an update on the back channel 530. In some such embodiments, this may occur whenever the Decision Maker 508 is also asserting to its routers 514 516. It may also occur when the Decision Maker 508 decides the current routes are correct. By exchanging information via the back channel 530, Decision Makers 508 510 512 may inform one another about local conditions. Additionally, if local scores change by a sufficient amount, this may be announced via the back-channel 530, even if the change in score doesn't affect local routing. In embodiments of the invention, the BGP processes used for coordination do not peer directly to the routers 514. Rather, they connect to the Decision Maker 508, and the Decision Maker 508 decides whether to pass on the update to the routers 514 516, as well as whether to modify it.

In some embodiments of the invention, the BGP process for coordination is configured so that the Decision Maker 508 is a route reflector client of the other Decision Makers 510 512. The Decision Maker 508 is also a route reflector client of the edge routers it controls 514 516. Thus, in such embodiments, the Decision Makers 508 510 512 do not simply transmit information in either direction without consideration; rather, these BGP processes are separate data channels.

In embodiments of coordination implemented with BGP, a scalar performance score exchanged between Routing Intelligence Units may be translated to units of Local Preference, where some implementations of Local Preference use 8 bits and others use 16 bits. Using Local Preference ensures that the new BGP mesh 530, or back-channel, will automatically select and propagate the best score. Other embodiments of the invention implemented with BGP may transfer scalar performance scores encoded within the community attribute, the extended communities attribute, the multi-exit discriminator attribute, or some combination of all of the above.

Embodiments of the invention also include procedures for a Decision Maker 508 to decide whether to use a prefix which arrives via coordination with the other decision makers 510 512. Some implementations avoid use of such remote routes unless they are distinctly attractive. Thus, in such embodiments, given a choice between comparable local and remote routes (wherein 'comparable' may mean within a winner-set width), the local route is always used. Other implementations may include:

a static penalty applied to all remote announcements a static penalty per remote Decision Maker a static penalty per remote SPAL dynamic penalties per remote Decision Maker In the case of dynamic penalties per Decision Maker, it is possible to have one Decision Maker 508 probe all others 510 512 actively, and use the measure of distance between Routing Intelligence Units as a dynamic penalty. Other methodologies for implementing dynamic penalties will be apparent to those skilled in the art.

D. Queuing Architecture

Figure 6:
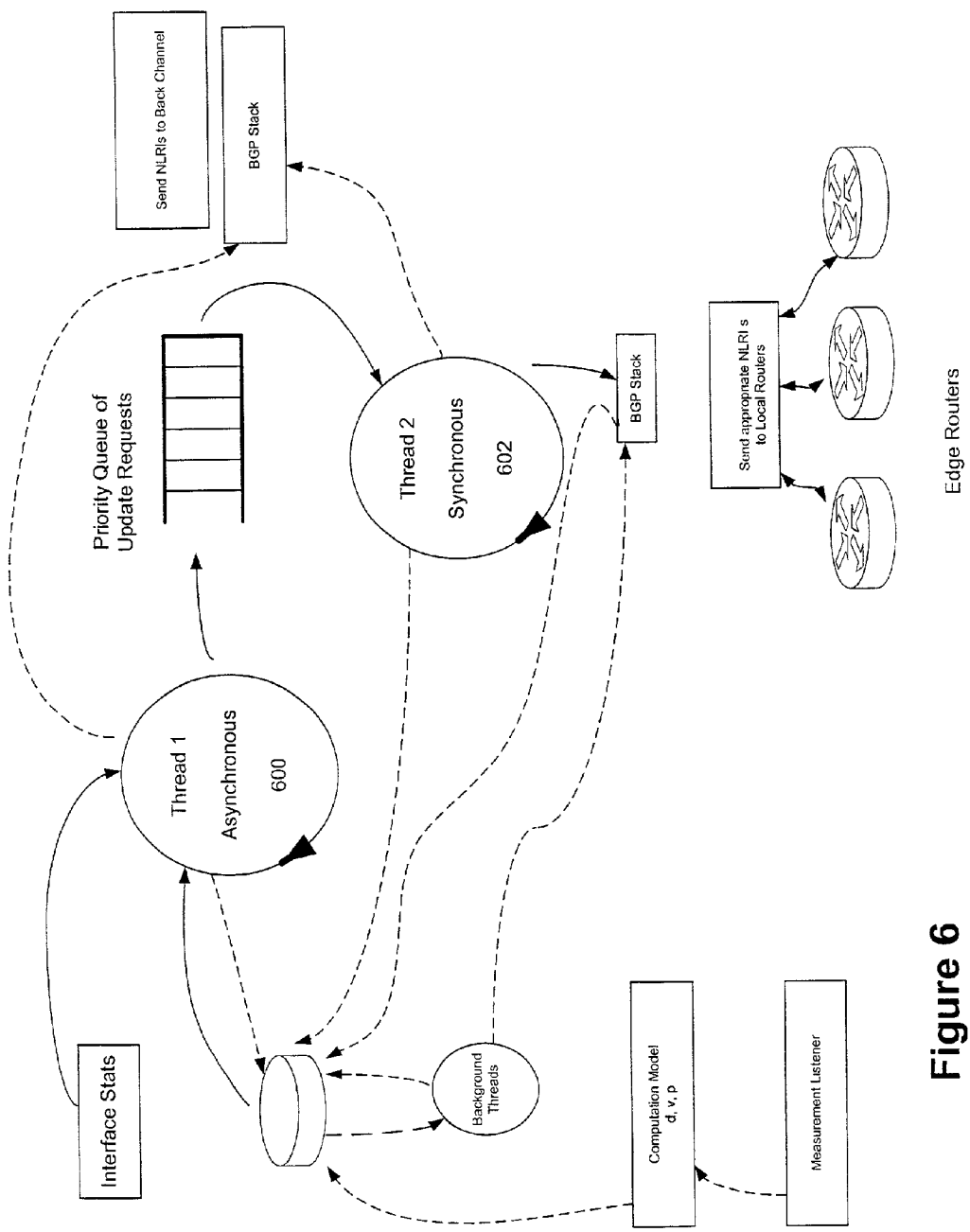
FIG. 6 illustrates a queuing and threading structure used in the routing intelligence unit in some embodiments of the invention.

A diagram showing the high level mechanics of the decision maker prefix scheduler is shown in FIG. 6. As illustrated in FIG. 6, two threads essentially drive the operation of the scheduler. The first thread polls the database for changes in terms of per-SPAL performance, load, or coverage, and decides on which prefix updates to insert in a Priority Queue that holds prefix update requests. The second thread takes items out of the queue in a rate-controlled fashion, and converts the corresponding update requests into an appropriate set of UPDATEs that it sends to the local routers, and an appropriate set of UPDATEs that it sends to the back channel for communication to other Routing Intelligence Units.

In the following, we describe each thread separately. In the description, we will refer to tables in the database, and to fields within these tables. The contents of this database are also explicated in U.S. Provisional Applications No. 60/241, 450, filed Oct. 17, 2000 and U.S. Provisional Application No. 60/275,206, filed Mar. 12, 2001, and U.S. application Ser. No. 09/903,441, filed Jul. 10, 2001, U.S. application Ser. No. 09/923,924, filed Aug. 6, 2001, and U.S. application Ser. No. 09/903,423, filed Jul. 10, 2001, which are hereby incorporated by reference in their entirety.

Thread 1

This first thread 600 polls the database for changes in terms of per-SPAL performance, load, or coverage, and decides on which prefix updates to insert in a Priority Queue that holds prefix update requests.

In some embodiments of the invention, such changes are checked for in 2 passes. The first pass looks for group level changes, wherein a group comprises an arbitrary collection of prefixes. Groups are also described in U.S. Provisional Applications No. 60/241,450, filed Oct. 17, 2000 and U.S. Provisional Application No. 60/275,206, filed Mar. 12, 2001, and U.S. application Ser. No. 09/903,441, filed Jul. 10, 2001, U.S. application Ser. No. 09/923,924, filed Aug. 6, 2001, and U.S. application Ser. No. 09/903,423, filed Jul. 10, 2001, which are hereby incorporated by reference in their entirety. In case a significant change in performance for a group is noticed, the group is unpacked into its individual prefixes; the corresponding prefixes are checked and considered for insertion in the priority queue. The second pass captures prefixes for which there are no group-level performance changes.

An update request for a prefix can be made in a number of different circumstances. Non-limiting examples of such circumstances include any one or more of the following:

1) In case a significant change in its performance score is witnessed on at least one of its local SPALs.
2) In case a significant change in its performance score is witnessed on a foreign SPAL (that is, a SPAL that is controlled by a different Routing Intelligence Unit box in a coordinated system).
3) In case any of the local SPALs becomes invalid.
4) In case an update pertaining to this prefix was received from the router.
5) A peering with either a local or a remote router goes down, for instance, during the router's maintenance windows.
6) At the user's request.

Note that measurements reside at the group level; hence, Check 1 can be done in the first pass. On the other hand, all of Checks 2, 3, and 4 are prefix-specific and may be performed in Pass 2: indeed, foreign performance updates are transferred through the back channel in BGP messages, and hence correspond to particular prefixes. Also, SPALs may become invalid for some, and not necessary all prefixes in a group. Finally, updates from the router relate to the change of winner SPALs for some prefixes, or to the withdrawal of other prefixes. (In fact, any information that is transferred by BGP relates to prefixes.)

Pass 1

In some embodiments of the invention, in the first pass, an asynchronous thread goes through all groups in the GROUP_SPAL table, checking whether the NEW_DATA bit is set. This bit is set by the measurement listener in case a new measurement from a/32 resulted in an update of delay, jitter, and loss in the database. Delay, jitter, and loss, also denoted as d, v, and p, are used to compute an application-specific score, denoted by m. The scalar m. is used to rate application-specific performance; MOS stands for "Mean Opinion Score", and represents the synthetic application-specific performance. In embodiments of the invention, MOS may be multiplied by a degradation factor that is function of link utilization, resulting in m. (That is, the larger the utilization of a given SPAL, the larger the degradation factor, and the lower the resulting m)

In embodiments of the invention, users of the device may also configure penalty factors per SPAL. Non-limiting examples of the uses of such penalty features include handicapping some links relative to others, to achieving cost control, or accomplishing other policy objectives. As a non-limiting example, Provider X may charge substantially more per unit of bandwidth than Provider Y. In such a situation, the penalty feature allows the user to apply an m penalty to SPAL X. This will cause Provider Y to receive more traffic, except for those prefixes in which the performance of Provider X is substantially better. One implementation of this embodiment is to subtract the penalty for the appropriate SPAL after m is computed. Other implementations of the penalty feature will be apparent to those skilled in the art.

Even when NEW_DATA is set, the variation in d, v, and p can be small enough so that the change in the resulting scalar m is insignificant. Hence, in some embodiments of the invention, the prefix is only considered for insertion in the queue in case the change in m is significant enough. The corresponding pseudo-code is shown below.
for each group

```
for each group
{
    // First pass: only consider groups for which there
is a change in the group pref data
    compute_winner_set = 0;
    for each spal (<> other)
    {
        // check whether there is new data for this group
        if (new_data(group, spal)==1)
        {
            compute m (spal, d, v, p, spal-penalty),
store in local memory
            new_data(group, spal) = 0;
            if (significant change in m)
            {
                store m (spal, d, v, p) in
group_spal
                compute_winner_set = 1;
                break;
            }
        }
    }
    if (compute_winner_set)
        for each prefix
            schedule_prefix(prefix) // see below
}
```

In some embodiments of the invention, rolling averages are used to update measurements of delay, jitter, and loss, i.e., d=alpha*d+(1−alpha)*dnew
v=beta*v+(1−beta)*vnew
p=gamma*p+(1−gamma)*pnew, where dnew, vnew, pnew represent the new delay, jitter, and loss measurements. Algorithms for calculating MOS for HTTP (1.0 and 1.1) and for voice and video are also presented in U.S. Provisional Applications No. 60/241,450, filed Oct. 17, 2000 and U.S. Provisional Application No. 60/275,206, filed Mar. 12, 2001, and U.S. application Ser. No. 09/903,441, filed Jul. 10, 2001, U.S. application Ser. No. 09/923,924, filed Aug. 6, 2001, and U.S. application Ser. No. 09/903,423, filed Jul. 10, 2001. Values used for the models employed by these algorithms in embodiments of the invention are presented in an XML format below. Note that since MOS is computed per group, a selection from the sets of the following parameters may be made to allow different optimization goals for each group.

<module><engine slot="1"><application model="http1.0" [alpha="0.9" beta="0.9"
gamma="0.9" theta="1.18" phi="0.13" omega="0.15" psi="0.25"]/>
</engine></module>
<module><engine slot="1"><application model="http1.1" [alpha="0.9" beta="0.9"
gamma="0.9" theta="1.3" phi="0.31" omega="0.41" psi="1.0"]/>
</engine></module>
<module><engine slot="1"><application model="voice" [alpha="0.9" beta="0.9" gamma="0.9" theta="1.5" phi="6.0" omega="23.0" psi="0.0"]
/></engine>
</module>
<module><engine slot="1"><application model="video" [alpha="0.9" beta="0.9"
gamma="0.9" theta="1.0" phi="4.0" omega="69.0" psi="0.0"]/>
</engine></module>

The values presented above are given as examples only. Many different models for deriving MOS scores for different applications will be apparent to those skilled in the art.

Pass 2

In some embodiments of the invention, in the second pass, an asynchronous thread goes through all prefixes in the PREFIX table. In some such embodiments, for each prefix, Checks 2, 3, and 4 are made: NEW_INCOMING_BID in the PREFIX table indicates that a new bid was received from the coordination back channel; NEW_INVALID in the PREFIX_SPAL table indicates, for a particular (Prefix P, SPAL x) pair a loss of coverage for Prefix P over SPAL x. NEW_NATURAL_DATA indicates the receipt by Routing Intelligence Unit of an update message from a router, notifying it of a change in its natural BGP winner. In fact, the Decision Maker only asserts a performance route in case it is not the same as the natural BGP route; hence, it can potentially receive updates concerning the natural BGP winners of given prefixes from routers to which it has asserted no performance route for those prefixes. (The advantage of such an implementation is that when no performance route is sent to a router, the routing intelligence unit will get routing updates from that router. In contrast, if performances route were asserted regardless of whether they agree with the natural BGP choice, the Routing Intelligence Unit would never receive an update from the router pertaining to changes in the natural BGP winner for the different prefixes. If Routing Intelligence Unit were to assert performance routes regarding a given prefix P to all routers irrespectively of the current BGP winner for that prefix, it will never receive an update from the router pertaining to changes in the natural BGP winner for Prefix P. Indeed, the performance route would always be the winner, so the router would assume there is nothing to talk about.)

The following example illustrates the usefulness of the NEW_NATURAL_DATA flag: Assume that the Decision Maker controls 3 routers, each of which controls its individual SPAL. Assume that the Decision Maker has just determined that Prefix P will move to SPAL 1. Assume that Prefix P believes that the natural BGP route for Prefix P as saved by Router 1 is SPAL 1, the same as its current performance assertion. The Decision Maker's logical operation is to withdraw Prefix P's last performance route (say SPAL 3). However, it turned out that this BGP natural route has, in fact changed to SPAL 2; indeed, this could have happened during the previous assertion of a performance route for Prefix P (since, in this case, as mentioned above, the Decision Maker receives no updates for Prefix P from the router, despite potential changes in Prefix P's natural BGP winner). As a result of this discrepancy, all traffic pertaining to Prefix P will be routed through SPAL 2, the current natural BGP winner for Prefix P, which is not the desired behavior.

This is the primary reason for NEW_NATURAL_DATA: as such an event occurs, the router sends an update back to the Decision Maker, communicating to it the change in natural route. The incoming BGP messages from the local routers are processed by a process referred to as the Peer Manager. The Peer Manager sees the change in natural BGP route and sets the NEW_NATURAL_DATA flag to 1; consequently, the prefix is considered for re-scheduling during this pass, in Thread 1, as described above. Note that in case of changes in the natural BGP route for a given prefix, the Decision Maker will need two passes through the Priority Queue before the prefix is routed through its appropriate performance route.

Finally, the ACCEPTING_DATA bit in the prefix table is checked. ACCEPTING_DATA is set to 0 by the peer manager to notify the decision maker not to assert performance routes for this prefix. This would primarily occur in case the prefix is withdrawn from the BGP tables in all local routers. In this case, in the ROUTER_PREFIX_SPAL table, the peer manager would have set the ANNOUNCED bits for that prefix on all SPALs to zero. Clearly, a prefix is only considered for insertion in the queue in case ACCEPTING_DATA is set to 1.

```
for each prefix
{
    //Checks 2 and 4: scan the prefix_group table
    get new_bid, new_natural, and accepting_data from prefix_group
        if (new_bid) || (new_natural)
        {
            if (accepting_data)
            {
                schedule_prefix(prefix) // see below
            }
        }
        //Check 3: scan the prefix_spal table
        get new_invalid, from prefix_spal
        if (new_invalid)
        {
            schedule_prefix(prefix)          }
}
```

Note that asserting a performance route about a prefix that does not exist in any of the routers' BGP tables could be problematic, depending on the surrounding network environment. If the set of controlled routers do not emit routes to any other BGP routers, then it is acceptable to generate new prefixes. But if any propagation is possible, there is a danger of generating an attractor for some traffic.

Specifically, if the new route is the most specific route known for some addresses, then any traffic to those addresses will tend to forward from uncontrolled routers towards the controlled routers. This can be very disruptive, since such routing decisions could be very far from optimal.

The mechanism can cope with this in a number of ways:

Prevent any use of a prefix unknown to BGP. This is achieved using the ACCEPTING_DATA check included in some embodiments of the invention.

Permit all such use, in a context where new routes cannot propagate

Permit such use, but mark any new prefix with the well-known community value no-advertise to prevent propagation Permit such use, but configure the routers to prevent any further propagation (in some embodiments, by filtering such prefixes)

Deciding to Insert a Prefix Update Request in the Priority Queue: The schedule prefix Function Once a prefix P makes it through the checks imposed in either Pass 1 or Pass 2, it is considered for insertion into the prefix update priority queue. schedule_prefix includes the related functionality, described below:

First of all, a winner set of SPALs is re-computed for P; this set includes SPALs for which the performance is close to maximal.

After the winner set W is computed for P, the decision maker determines whether the current route for P is included in W.

In case of a coordinated Routing Intelligence Unit system, in some embodiments of the invention, the back channel is sent updates pertaining to Prefix P even if the local prefix update request is dropped. For example, the performance on local links could have changed dramatically since the last time a bid was sent to the back channel for this prefix; in the event of such an occurrence, an updated bid is sent to the back channel (through the BGP peering set up for this purpose).

In case the current route is not part of the newly computed winner set, it is clear that Prefix P is not routed optimally. Before going ahead and inserting an update request for Prefix P in the queue, the Routing Intelligence Unit performs a check of the flapping history for Prefix P. In case this check shows that Prefix P has an excessive tendency to flap, no prefix update request is inserted in the queue.

In some embodiments of the invention, before the prefix is inserted in the queue, a SPAL is chosen at random from the winner set. In case the winner set includes a remote SPAL controlled by a coordinated Routing Intelligence Unit as well as a local SPAL, the local SPAL is always preferred. Also, in some embodiments of the invention, the randomness may be tweaked according to factors pertaining to any one or more of the following: link bandwidth, link cost, and traffic load for a given prefix. Finally, the state in the database is updated, and the element is inserted in the Priority Queue. The rank of the prefix update in the priority queue is determined by computing the potential percent improvement obtained from moving the prefix from its current route to the pending winner route.

At the outset, a winner set of SPALs is re-computed for P; this set includes SPALs for which the performance is close to maximal. In some embodiments of the invention, invalid SPALs are excluded from the winner set computation. Bids from remote SPALs under the control of coordinated Routing Intelligence Units may, in embodiments, be included in the winner set computation. Since the bids corresponding to such remote routes are filtered through BGP, they are in units which are compatible with iBGP's LocalPref, which in some implementations is limited to 0-255. Therefore one possible implementation is to multiply m by 255. The converted quantity is referred to as MSLP. For consistency, the m values computed for local SPALs are also converted to local_pref units. The new winner is then determined to be the set of all SPALs for which MSLP is larger than MSLP-max—winner-set-threshold, where $MSLP_{max}$ represents the maximum MSLP for that prefix across all available SPALs, and winner-set-threshold represents a customer-tunable threshold specified in LocalPref units. The related pseudo-code is shown below.

```
for each spal (<>other)
{
    get invalid bit from prefix_spal
    if (invalid)
    {
        mark spal as invalid, not to be used in winner_set computation
        continue
    }
    convert m (spal) to MSLP
```

-continued
```
        Store MSLP in prefix_spal table
    }
    for spal=other
    {
        get MSLP_other = other_bid in prefix_group table
    }
    compute winner_set (prefix) // considers winners among all valid
    spals and other_bid
```

After the winner set W is computed for P, the decision maker determines whether the current route for P is included in W. Indeed, in such a case, the performance of that prefix can't be improved much further, so no prefix update request needs to be inserted in the queue.

Even though an update request for a given prefix is ignored, the Decision Maker may still send an update to the back channel in certain embodiments. For example, even though the current route for Prefix P is still part of the winner set, performance degradation could have affected all SPALs at once, in which case the bid that was previously sent to the back channel for Prefix P is probably inaccurate. In some embodiments, one may solve this problem by implementing the following: the last bid for a given prefix is saved as MY_BID in the PREFIX table; a low and high threshold are then computed using two user-configurable parameters, bid-threshold-low and bid-threshold-high. In case of a significant difference between the MSLP score on the current route and the last score sent to the back channel for that prefix (i.e., MY_BID) is witnessed (that is, if the new score falls below (1−bid-threshold-low)*100% or jumps to a value that is larger than (1+bid-threshold-high)*100% of MY_BID), a BGP message is sent to the back channel, carrying the new bid for Prefix P to remote coordinated Routing Intelligence Units. Pseudo-code illustrating the functionality described here is shown below.

```
//First, detect non-communicated withdrawal of a prefix
if winner_set only comprises remote link
{
    for all local routers
        if performance route exists for that (prefix,
router) pair in the ROUTER_PREFIX_SPAL table
            send urgent withdrawal of this route to
edge router
    continue
}
get current_winner(prefix) and pending_winner(prefix) from
prefix_spal table
if (pending_winner!=current_winner)
{
    if (current_winner in winner_set)
    {
        update pending_winner = current_winner in database
        continue
    }
    if (current_winner not in winner_set)&&(pending_winner in
winner_set)
    {
        continue
    }
}
if (current_winner==pending_winner)
{
    if (new natural)
    {
        for all routers
        {
            current route_per_router = SPAL(prefix,
router, type = natural, state = latest_ON)
```

-continued
```
            if (current_route_per_router exists) &&
(current_route_per_router != current_winner)
            {
                special_route =
current route_per_router
                set local special_route_flag = 1;
                break;
            }
        }
    }
    else
    {
        current_route = current_winner
    }
    if (current_route in
winner_set) || (special_route==current_winner)
    {
        get bid_low_threshold and bid_high_threshold from
prefix_group table
        if ((MSLP(prefix, current_spal) <
bid_low_threshold) || (MSLP(prefix, current_spal) >
bid_high_threshold))
        {
            compute bid_low_threshold and
bid_high_threshold from MSLP (prefix)
            store bid_low_threshold and
bid_high_threshold in prefix_group
            form UPDATE to send to backchannel SBGP
        }
        continue
    }
}
```

At this point, it is clear that Prefix P is not routed optimally. In some embodiments of the invention, before proceeding with sending the update request to the edge router, the Routing Intelligence Unit performs a check of the flapping history for Prefix P. An algorithm whose operation is very close to the flapping detection algorithm in BGP monitors the flapping history of a prefix. The algorithm can be controlled by, in one embodiment, three user-controlled parameters flap_weight, flap_low, and flap_high and works as follows: the tendency of a prefix to flap is monitored by a variable denoted FORGIVING_MODE that resides in the PREFIX table. FORGIVING_MODE and other flapping parameters are updated in Thread 2 right before a performance route pertaining to Prefix P is asserted to the local routers. In case FORGIVING_MODE is set to 1, the tendency for Prefix P to flap is considered excessive, and the prefix update request is ignored. Conversely, in case FORGIVING_MODE is set to 0, Prefix P has no abnormal tendency to flap, so it is safe to consider its update request.

```
            get flapping state for prefix from prefix_group table
            if (excessive flapping)
            {
                continue
            }
```

If a prefix survives to this point in Thread 1, it will deterministically be inserted in the queue. Hence, all bits that were checked should be reset at this point so that some other pass on the prefixes does not reconsider and reschedule the prefix update request. For example, in case the prefix belongs to a group for which there was a significant change in m, the prefix will be considered for insertion in the queue in Pass 1, and should not be reconsidered in Pass2.

```
//reset prefix level bits, if necessary
for each spal (<> other)
{
    get new_invalid bit from prefix_spal
    if (new_invalid)
        reset new_invalid to 0 in prefix_spal
}
get new_bid and new_natural bits from prefix_group
if (new_bid)
    reset new_bid to 0 in prefix_group
if (new_natural)
    reset new_natural to 0 in prefix_group
```

In some embodiments of the invention, before the prefix is inserted in the queue, a SPAL is chosen at random from the winner set. This way, traffic is spread across more than one SPAL, hence achieving some level of load balancing. In order to achieve some set of desirable policies, randomness can be tweaked in order to favor some SPALs and disregard others. For example, in some embodiments, in case the winner set includes a remote SPAL controlled by a coordinated Routing Intelligence Unit as well as a local SPAL, the local SPAL is always preferred. In other words, a remote SPAL is only the winner in case it is the only available SPAL in the winner set. Also, depending on the weight of a prefix and the observed load on different links, one can tweak the probabilities in such a way that the prefix is routed through a SPAL that fits it best. (This feature corresponds to the "Saturation Avoidance Factor"—SAF, described later in this document) After a winner is selected, PENDING_WINNER in PREFIX_SPAL is updated to reflect the new potential winner. Finally, the element is inserted in the Priority Queue. In some embodiments, the rank of the prefix update in the priority queue is determined by computing the percent improvement; that is, the percent improvement obtained from moving the prefix from its current route to the pending winner route. That is, percent-improvement=[score(pending_winner)−Score(current_route)]/Score(current_route). The special-spal-flag is part of the data structure for the update, as it will be used in the determination of which messages to send to the local routers.

```
if ((winner_set_size>1) and (other in winner_set))
    remove other from winner_set
select spal from winner_set at random
update PENDING_WINNER in PREFIX_SPAL table
compute percent_improvement for prefix
insert prefix in prefix update queue
```

Thread 2

In this thread 602 elements are taken out of the queue in a rate-controlled manner. In some embodiments of the invention, this rate is specified by the customer. The update rate is often referred to as the token rate. Tokens are given at regular intervals, according to the update rate. Each time a token appears, the head of the queue is taken out of the queue, and considered for potential update. In case the database shows that more recent passes in Thread 1 have canceled the update request, it is dropped without losing the corresponding token; the next update request is then taken out from the head of the queue; this procedure is performed until either the queue empties, or a valid request is obtained. In some embodiments of the invention, when an update request that corresponds to Prefix P is determined to be current (thus, valid), one or more of the following tasks are performed:

The flapping state is updated for Prefix P. The database is updated to reflect the new actual winner; more specifically, the pending winner, chosen before inserting the prefix update request at the end of the first thread now becomes the current winner.

The database is checked to determine the current state of each of the individual routers. Accordingly, individual UPDATEs are formed and sent to each of the routers. For example, no performance route is sent to an edge router in case the BGP winner for Prefix P, according to that router is found to be the same.

An UPDATE is sent to the back channel, describing the new local winner.

Finally, the database is updated to keep track of the messages that were sent to each of the routers, as well as the expected resulting state of these routers.

In this thread 602 elements are just taken out from the queue in a rate-controlled manner, according to an update rate that may be set by the customer. The update rate is often referred to as the token rate: indeed, tokens are given at regular intervals, according to the update rate. Each time a token appears, the head of the queue is taken out, and considered for potential update.

Assume that the update request concerns Prefix P. The PREFIX_SPAL table is checked to obtain the PENDING_WINNER and CURRENT_WINNER for Prefix P. In case PENDING_WINNER and CURRENT_WINNER correspond to the same SPAL, this is an indication that a more recent pass in Thread 1 has canceled the update request; in this case, the update request is dropped, without losing the corresponding token; the next token request is then polled from the head of the queue; this procedure is performed until either the queue empties, or a valid request, for which PENDING_WINNER and CURRENT_WINNER are different, is obtained.

Having different pending and current winners reflects a valid update request. In this case, the Decision Maker should assert the winning route for Prefix P. When a prefix update request is considered still valid, it is implemented. In the process, a series of tasks are performed. First, the flapping state is updated for Prefix P. In some embodiments of the invention, the tendency of a prefix to flap is monitored by a variable denoted INTERCHANGE_RATE that resides in the PREFIX table. The flap_weight parameter dictates the dynamics of INTERCHANGE_RATE; more specifically, at this point in the algorithm thread, INTERCHANGE_RATE is updated using the last value of INTERCHANGE_RATE, as stored in the table, LAST_ICR_TIME, also stored in the PREFIX table, and flap_weight. In case the new computed INTERCHANGE_RATE is below flap_low, Routing Intelligence Unit considers the tendency for that prefix to flap to be low. On the other hand, when INTERCHANGE_RATE exceeds flap_high, the Routing Intelligence Unit considers the tendency for that prefix to flap to be high. That is, the algorithm functions in the following fashion:

In case FORGIVING_MODE (also in the PREFIX table) is set to 0, and INTERCHANGE_RATE exceeds flap_high, FORGIVING_MODE is set to 1.

In case FORGIVING_MODE is set to 1, but INTERCHANGE_RATE drops below flap_low, FORGIVING_MODE is set to 0 again, and the prefix update request survives this check.

In case FORGIVING_MODE is set to 1 and INTERCHANGE_RATE is larger than flap_low, or FORGIV- ING_MODE is set to 0, and INTERCHANGE_RATE is below flap_high, FORGIVING_MODE does not change.

Note that the method presented above is only one technique for controlling flapping; others will be apparent to those skilled in the art.

In some embodiments of the invention, the two parameters flap_low, and flap_high are separated by an amount to avoid hysteresis between the two values. Then, the Decision Maker updates the PREFIX_SPAL table to reflect this change; more specifically, CURRENT_WINNER is moved to PENDING_WINNER in the table. At this time, the ROUTER_PREFIX_SPAL table is queried to capture the current state of each router in regards to Prefix P. Accordingly, different UPDATEs are formed and sent to each of the routers.

In some embodiments of the invention, the Decision Maker only asserts a performance route in case it is not the same as the natural BGP route; indeed, if Routing Intelligence Unit were to assert performance routes regarding a given prefix P to all routers irrespectively of the current BGP winner for that prefix, it will never receive an update from the router pertaining to changes in the natural BGP winner for Prefix P. (Indeed, the performance route would always be the winner, so the router would assume there is nothing to talk about.)

Also, an UPDATE is sent to the back channel, describing to other Routing Intelligence Units in a coordinated system the new local winner. Finally, the database is updated to keep track of the messages that were sent to each of the routers, as well as the expected resulting state of these routers.

Prior to forming the UPDATEs, the database is updated as to include the new flap parameters and prefix-SPAL information (i.e., the new current SPAL for that prefix). The BGP update sent to an edge router may be filtered out by policy on the router. However, assuming the update is permissible, it may be made to win in the router's BGP comparison process. One implementation is to have the edge router to apply a high Weight value to the incoming update. (Weight is a common BGP knob, supported in most major implementations of the protocol, but it is not in the original protocol specification) This technique constrains the update so that it gains an advantage only on the router or routers to which the update is directly sent; this is desirable if some other routers are not controlled by a device such as the one described here. It is also possible to send the update with normal BGP attributes which make the route attractive, such as a high LocalPref value.

```
if (local_token available)
{
    get prefix at the head of the local update queue
    updatePrefixSpal(prefix, spal)
    updateFlapStats(prefix)
    compute bid_low_threshold and bid_high_threshold from
MSLP(prefix)
    store bid_low_threshold and bid_high_threshold in
prefix_group
        form UPDATE to send to local SBGP
        form UPDATE to send to backchannel SBGP
}
```

E. Technical Considerations

Queue Size

In some embodiments of the invention, a maximum queue size is to be chosen by the customer. In some embodiments, a small queue size may be chosen, so the maximum delay involved between the time instant a prefix update request is queued and the time instant it is considered by the second thread as a potential BGP update is small. For example, in case the token rate corresponding to a given link is 10 tokens per second, and we choose not to exceed a 2 second queuing delay, the queue should be able to accommodate 20 prefix update requests. Note that this method is simple, and only requires the knowledge of the token rate and the maximum acceptable delay.

Maximum Rate of Prefix Updates

It is desirable for the Routing Intelligence Unit to remain conservative in the rate of updates it communicates to the edge-router. This is the function of the token rate, which acts as a brake to the whole system. In some embodiments of the invention, the responsibility for setting the token rate is transferred to the customer, who selects a token rate that best fits her bandwidth and traffic pattern.

F. Feedback from the Listener BGP

The feedback from the listener BGP is valuable as it describes the actual current state of the local edge routers. Accordingly, in some embodiments of the invention, a separate routing intelligence unit thread modifies the content of the database according to the state it gets from the router(s). The Routing Intelligence Unit can operate more subtly in case it is a perfect listener; we consider the Routing Intelligence Unit to be a perfect listener if it has knowledge of the individual BGP feeds from each individual SPAL. That is, in case the Routing Intelligence Unit is connected to three access links, each connecting to a separate provider, the Routing Intelligence Unit is a perfect listener if it has access to each of the three feeds handed by each of these providers.

Configuring Routing Intelligence Unit as a Perfect Listener is desirable, as it allows the support of private peerings. For example, unless Routing Intelligence Unit is configured as a Perfect listener, when Routing Intelligence Unit hears about a prefix, it can't assume that coverage exists for that prefix across all SPALs. Considering the scenario described above, a prefix that the Routing Intelligence Unit learns about could be covered by any of the three SPALs the router is connected to. For example, assume that only SPAL 1 has coverage for a given prefix P; in case the Routing Intelligence Unit asserts a performance route for that prefix across SPAL 2, there is no guarantee that the traffic pertaining to that prefix will be transited by the Service Provider to which SPAL 2 is connected (which we denote Provider 2). In case Provider 2 actually has a private peering with Provider X that obeys to some pre-specified contract, Provider X could well monitor the traffic from Provider 2, and filter all packets that do not conform to that contract. In case this contract namely specifies that Provider X will only provide transit to customers residing on Provider X's network, then the traffic pertaining to Prefix P will be dropped. If Routing Intelligence Unit were a Perfect Listener, it would only assert performance routes for prefixes across SPALs that are determined to have coverage for these prefixes. This behavior may be referred to as "extremely polite".

In some embodiments, the Routing Intelligence Unit is capable of avoiding the "Rocking the boat" problem, which stems from unwanted propagation of prefixes which did not already exist in BGP. The Routing Intelligence Unit can operate in "impolite" mode, where any prefixes may be used, or in "polite" mode, where only those prefixes which were previously present in BGP can be used. An ANNOUNCED bit resides in the ROUTER_PREFIX_SPAL table, and is set by the Peer Manager in case the Routing Intelligence Unit hears about a prefix from any of the Routers. This bit allows use of "polite" mode by the following procedure: in case the ANNOUNCED bit is set to 0 for all (router, SPAL) combinations in the ROUTER_PREFIX_SPAL table, then ACCEPTING_DATA is set to 0 in the PREFIX table.

G. Urgent Events

In case a catastrophic event occurs, such as a link going down, some embodiments of the invention send urgent BGP updates to the router. These urgent updates have priority over the entire algorithm described above. For example, in case a SPAL has lost coverage for a prefix, an urgent BGP message should be sent to the router, requesting to move the prefix to other SPALs. A list of urgent events upon which such actions may be taken, and a description of the algorithms pertaining to these actions, are described below.

Algorithm for the Detection of an Invalid SPAL

In some embodiments of the invention, a specific (Prefix P, SPAL x) pair is invalidated in case there are reasons to believe that SPAL x no longer provides coverage to Prefix P. One possible implementation is described as follows. Measurements corresponding to a (Prefix, SPAL) pair are assumed to arrive to the Decision Maker at something close to a predictable rate. A background thread that is independent from Threads 1 and 2 computes this update rate, and stores a time of last update, the LAST_UPDATE_TIME. Another background thread verifies that LAST_ICR_TIME is reasonable given UPDATE_RATE. For example, assuming that measurements come in following a Poisson distribution, it is easy to verify whether LAST_ICR_TIME exceeds a fixed percentile of the inter-arrival interval. As LAST_UPDATE_TIME increases, the Decision Maker becomes more and more worried about the validity of the path. In the current design, there are two thresholds: at the first threshold, the NEW_INVALID and INVALID flags are set in the PREFIX_SPAL table. As described in Thread 1 above, setting the NEW_INVALID flag for a (Prefix P, SPAL x) pair will prevent any new update requests for Prefix P to be routed through SPAL x. At this stage, no other action is taken. At the second threshold, the Decision Maker becomes "very concerned" about routing Prefix P through SPAL x; hence, an urgent check is made to see whether Prefix P is currently routed through SPAL x, in which case an urgent UPDATE is created (that is, an UPDATE that bypasses the entire queue system) in order to route Prefix through a different SPAL.

H. Saturation Avoidance Factor

Some embodiments of the invention support a Saturation Avoidance Factor, which measures the effect of a prefix on other prefixes. In some embodiments of the invention, the "Saturation Avoidance Factor" (SAF) pertaining to a given prefix may be taken into account when prefixes are sorted in the Priority Queue. This SAF measures the effect of a prefix on other prefixes. That is, if, upon scheduling a prefix on a given link, its effect on the other prefixes already scheduled on that link is high (i.e., this effectively means that the aggregate load for this prefix is large), its SAF should be low. The lower the SAF of a prefix, the lower its place in the Priority Queue. This way, the algorithm will always favor low load prefixes rather than high load prefixes. Note that in some embodiments, the SAF is not directly proportional to load. For example, a prefix that has a load equal to 0.75C has a different SAF whether it is considered to be scheduled on an empty link or on a link which utilization has already reached 75%. In the later case, the SAF should be as low as possible, since scheduling the prefix on the link would result in a link overflow.

At times, the token rate may be slower than the responded feedback. In case link utilization information is obtained through interface-stats, the token rate may be slower than the rate at which utilization information comes in. Also, the token rate may be slower than the rate at which edge-stats measurements come in.

Additionally, in some embodiments, each prefix is considered at a time. That is, PQServiceRate is small enough so that no more than one token is handed at a time. For example, denoting by T the token rate obtained from the above considerations, PQServiceRate is equal to 1/T. If more than one token were handed at one time, two large prefixes could be scheduled on the same link, just as in the example above, potentially leading to bad performance.

In some embodiments of the invention, the SAF is a per-prefix, per-SPAL quantity. For example, assume that a prefix carries with it a load of 75% the capacity of all SPALs. If we have a choice between two SPALs, SPAL 1 and SPAL 2, SPAL 1 already carrying a load of 50%, the other having a load of 0%. In this case, moving Prefix p to SPAL 1 will result in bad performance not only for itself, but also for all other prefixes already routed through SPAL 1. In this case, the SAF is close to 0, even if performance data across SPAL 1 seems to indicate otherwise. On the other hand, the SAF of moving Prefix p to SPAL 2 is, by contrast, very good, since the total load on the link will remain around 75% of total capacity, so delays will remain low. If, instead of carrying a load of 75% capacity, Prefix p carried a load of 10% capacity, the results would have been different, and the SAF of Prefix p across SPALs 1 and 2 would have been close. In some embodiments of the invention, without knowing the load of a link, we can still measure the effect of moving a given prefix to a given SPAL through RTT measurements. That is, instead of measuring the load directly, we measure the end result, that is the amount by which performance of prefixes across a link worsens as a result of moving a prefix to it.

Modifying the Schema for the Support of SAF

In order to support SAF, the schema may be include a load field in the SPAL table, and an SAF field in the PREFIX_SPAL table. In some embodiments, the SAF field is a per-prefix, per-SPAL information.

I. Available Bandwidth

Edge-stats measurements may include measurements of delay, jitter, and loss; using these measurements, an application-specific performance score may be obtained based on which a decision is made on whether to send an update request for this prefix. Available bandwidth is a valuable quantity that is measured and included in the computation of the performance score in some embodiments of the invention.

J. Differentiated Queues and Token Rates per Link

In some embodiments of the invention, token rates may differ on a per-link basis (which dictates the use of different queues for each link).

In some embodiments, the token rate may be tailored to total utilization. Lowly utilized links can afford relatively higher token rates without fear of overflow, whereas links close to saturation should be handled more carefully. Some embodiments of the invention provide one or more of the following modes of operation:

1. The default mode: the user specifies one token rate (and, optionally, a bucket size), shared equally among the prefixes updates destined to the different links.
2. The enhanced performance mode: the user specifies a minimum token rate (and, optionally, a bucket size). Depending on factors such as the total bandwidth utilization and the bandwidth of individual links, the prefix scheduler takes the initiative to function at a higher speed when possible, allowing better performance when it is not dangerous to do so.
3. The custom mode: in this case, the user can specify minimum and maximum token rates (and, optionally, bucket sizes), as well as conditions on when to move from a token rate to another. Using this custom mode, customers can tailor the prefix scheduler to their exact need.

K. Prefix Winner set Re-computation

Even though the priority queue is sized in such a way that the delay spent in the queue is minimized, there is still an order of magnitude between the time scale of the BGP world, at which level decisions are taken, and the physical world, in which edge stats and interface stats are measured. That is, even though the queuing delay is comparable to other delays involved in the process of changing a route, prefix performance across a given link or the utilization of a given link can change much more quickly. For example, a 2 second queuing delay could be appropriate in the BGP world, while 2 seconds can be enough for congestion to occur across a given link, or for the link utilization to go from 25% to 75% . . . For this reason, in some embodiments of the invention, the winner set is re-evaluated at the output of the priority queue.

L. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A communications back-channel, for coordinating routing decisions, the communications back channel comprising:
    a plurality of networking devices;
    a plurality of routing intelligence units, wherein each of the plurality of routing intelligence units includes software programmed to control a corresponding subset of the plurality of networking devices, each of the plurality of routing intelligence units including:
        one or more processes programmed to control a corresponding subset of networking devices; and
        one or more coordination processes programmed to generate and exchange routing performance information with the remaining plurality of routing intelligence units;
    a mesh coupling the one or more coordination processes, wherein the one or more coordination processes are programmed to exchange routing performance information over the mesh; and
    a set of links separate from the mesh and coupling the plurality of routing intelligence units to the plurality of networking devices.

2. The communications back-channel of claim 1, wherein the one or more processes programmed to control the distinct subset of networking devices are Border Gateway Protocol (BGP) sessions.

3. The communications back-channel of claim 2, wherein each of the routing intelligence units is a route-reflector client.

4. The communications back-channel of claim 3, wherein each of the distinct subset of networking devices is a route reflector to the route reflector client.

5. The communications back-channel of claim 1, wherein the one or more coordination process in each of the routing intelligence units includes BGP sessions.

6. The communications back-channel of claim 5, wherein the BGP sessions in the one or more coordination processes of each of the routing intelligence units includes:
    at least one BGP process; and
    at least one BGP stack, such that the at least one BGP stack is programmed to exchange routing performance information between the routing intelligence unit and the at least one BGP process, and the at least one BGP process is programmed to exchange routing performance information with the plurality of routing intelligence units.

7. The communications back-channel of claim 6, wherein the at least one BGP stack is a route reflector client, and the at least one BGP process is a route reflector.

8. The communications back-channel of claim 6, wherein the routing performance information includes local path performance characteristics.

9. The communications back-channel of claim 6, wherein the routing performance information includes performance scores for routes.

10. The communications back-channel of claim 9, wherein the performance scores are included in a Local Preference field in accordance with BGP.

11. A communications back-channel for coordinating routing decisions, the communications back channel comprising:
    a plurality of routers;
    a plurality of routing intelligence units, wherein each of the plurality of routing intelligence units includes software for controlling a distinct subset of the plurality of routers, wherein each of the plurality of routing intelligence units further includes:
        one or more processes for controlling the distinct subset of routers; and
        one or more coordination processes for exchanging performance information among the plurality of routing intelligence units; and
    a mesh directly coupling each of the plurality of routing intelligence units to the remaining routing intelligence units, the plurality of routing intelligence units programmed to exchange only performance information over the mesh.

12. The communications back-channel of claim 1, wherein a first process from the one or more processes programmed to control the distinct subset of routing devices peers to one or more of the plurality of networking devices, to a second process from the one or more processes for controlling the distinct subset of networking devices, and to a routing infrastructure exchange.

* * * * *

UNITED STATES PATENT AND TRADEMARK OFFICE
CERTIFICATE OF CORRECTION

| | |
|---|---|
| PATENT NO. | : 7,349,994 B2 |
| APPLICATION NO. | : 09/960623 |
| DATED | : March 25, 2008 |
| INVENTOR(S) | : Baldonado et al. |

It is certified that error appears in the above-identified patent and that said Letters Patent is hereby corrected as shown below:

Title Page;
Please change the spelling of the first inventor's name on the front page of the patent in sections (12) and (75) from Balonado to "Baldonado".

Signed and Sealed this

Twenty-fifth Day of May, 2010

David J. Kappos
*Director of the United States Patent and Trademark Office*